W. E. TRAVIS.
Cross-Cut Saw Handles.

No. 137,978.  Patented April 15, 1873.

ATTEST:
H. Sprague
H. F. Eberts.

INVENTOR:
Wm. E. Travis
Per Atty
Thos. S. Sprague

UNITED STATES PATENT OFFICE.

WILLIAM E. TRAVIS, OF YPSILANTI, MICHIGAN.

IMPROVEMENT IN CROSSCUT-SAW HANDLES.

Specification forming part of Letters Patent No. 137,978, dated April 15, 1873; application filed February 18, 1873.

*To all whom it may concern:*

Be it known that I, WILLIAM E. TRAVIS, of Ypsilanti, in the county of Washtenaw and State of Michigan, have invented a new and useful Improvement in Crosscut-Saw Handles; and I do declare that the following is a true and accurate description thereof, reference being had to the accompanying drawing and to the letters of reference marked thereon and being a part of this specification, in which—

Figure 1:
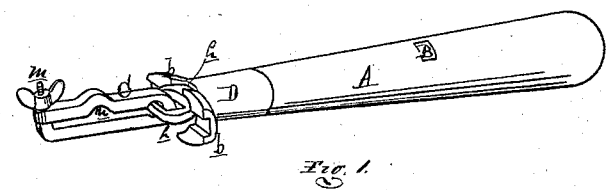
Figure 2:
Figure 3:
Figure 4:
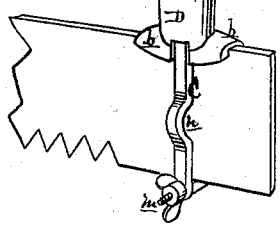
Figure 5:

Figure 1 is a perspective of my invention detached from a saw. Fig. 2 is a like view of the same secured to a section of a crosscut-saw for cutting vertically, or as used for cutting off a log when lying on the ground. Fig. 3 is a like view, similarly attached to a saw, for cutting horizontally, or as used for sawing off a standing tree. Fig. 4 is a plan of the clamp, which grasps the end of the saw and the coupling-bolt. Fig. 5 is a perspective of the end of the ferrule on the handle.

Like letters refer to like parts in each figure.

The nature of this invention relates to the construction of an adjustable and detachable saw tang or handle, so arranged that the saw may be readily operated in any desired position. The invention consists in so constructing a handle or tang for crosscut-saws that the saw, by a change in its position with relation to the handle, can readily be operated in any desired position, as more fully hereinafter described.

In the accompanying drawing, A represents a handle, into which is let the nut B to engage with the thread *a* of the coupling-bolt E. This handle A is provided with a tubular ferrule, D, the outer end of which terminates in the flanges *b*, and through these flanges is cut the channel *d*. Below the plane of the outer face of these flanges, and in the walls of the ferrule, and at right angles with the channel *d*, are cut opposite each other the transverse slots *h*. E is a coupling-bolt, threaded at one end, as shown at *a*, to be inserted into the handle A and through the ferrule D, when the bolt will engage with the nut B, by means of which said bolt is secured within the handle, and lengthened or shortened as desired. C is a jaw, made of two pieces, as shown, hinged at *k*, and secured at the opposite end by means of the thumb-nut *m* and a suitable bolt. The slot or opening between the parts of the jaw or clamp is designed to clasp the end of the saw, to which the whole may be secured. The end of the bolt E terminates in a square or rectangular loop, which engages with the hinged end of the clamp, as shown, when the saw is to be used for vertical cuts, and with the notch *n* when the saw is to be used for longitudinal cuts. For vertical cuts the end of the saw is inserted in the slot in the clamp, and then by turning the handle in the proper direction the coupling-bolt is shortened until the back of the saw is rigidly secured in the channel *d*, as shown.

What I claim as my invention, and desire to secure by Letters Patent, is—

1. A detachable saw handle or tang, made so as to be adjustable, as described, to enable the operator to use the saw in different positions, substantially as set forth.

2. A detachable and adjustable handle or tang for crosscut-saws, wherein the handle A, nut B, coupling-bolt E, ferrule D, and jaw or clamp C are constructed and arranged to operate substantially as and for the purposes specified.

WILLIAM E. TRAVIS.

Witnesses:
 H. F. EBERTS,
 H. S. SPRAGUE.